United States Patent
Consoli et al.

(10) Patent No.: US 12,108,287 B2
(45) Date of Patent: Oct. 1, 2024

(54) POTENTIAL QUALITY OF SERVICE (QOS) CHANGE NOTIFICATION METHODS AND NODES FOR ASSISTING APPLICATION ADJUSTMENT

(71) Applicant: Huawei Technologies Co., Ltd., Shenzhen (CN)

(72) Inventors: Antonio Consoli, Kista (SE); Ali Hamidian, Kista (SE); Siva Vakeesar, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 17/554,893

(22) Filed: Dec. 17, 2021

(65) Prior Publication Data

US 2022/0110024 A1    Apr. 7, 2022

Related U.S. Application Data

(63) Continuation of application No. PCT/EP2019/065850, filed on Jun. 17, 2019.

(51) Int. Cl.
*H04W 28/24* (2009.01)
*H04W 4/02* (2018.01)
(Continued)

(52) U.S. Cl.
CPC .......... *H04W 28/24* (2013.01); *H04W 4/025* (2013.01); *H04W 8/18* (2013.01);
(Continued)

(58) Field of Classification Search
CPC ....... H04W 28/16; H04W 28/24; H04W 4/00; H04W 4/02; H04W 4/025; H04W 28/00;
(Continued)

(56) References Cited

U.S. PATENT DOCUMENTS

| | | | | |
|---|---|---|---|---|
| 2003/0214905 A1* | 11/2003 | Solomon | ............... | H04L 1/0017 370/229 |
| 2014/0064084 A1* | 3/2014 | Paladugu | .............. | H04W 28/24 370/235 |

(Continued)

FOREIGN PATENT DOCUMENTS

| | | | | |
|---|---|---|---|---|
| CN | 104507126 | * | 4/2015 | ............ H04W 28/16 |
| CN | 113543196 | * | 10/2021 | ............ H04W 24/08 |

(Continued)

OTHER PUBLICATIONS

"3rd Generation Partnership Project; Technical Specification Group Services and System Aspects; Management and orchestration; 5G performance measurements (Release 16)," 3GPP TS 28.552 V16.2.0, Total 98 pages, 3rd Generation Partnership Project, Valbonne, France (Jun. 2019).

(Continued)

*Primary Examiner* — Warner Wong
(74) *Attorney, Agent, or Firm* — Leydig, Voit & Mayer, Ltd.

(57) ABSTRACT

A first radio network node for assisting application adjustment is configured to receive a potential quality of service change notification (PQCN) from a second radio network; associate the PQCN with an in-advance quality of service prediction notification (IQN) recipient based on a mapping between a request for an IQN from an IQN recipient and an existing PQCN subscription, wherein the mapping is established based on a location, a required quality of service (QoS) and at least one of: configuration information associated with the IQN recipient or subscription information associated with the IQN recipient; and send an IQN to the IQN recipient for assisting the application adjustment.

9 Claims, 9 Drawing Sheets

(51) Int. Cl.
   *H04W 8/18* (2009.01)
   *H04W 28/02* (2009.01)
   *H04W 28/08* (2023.01)
   *H04W 48/18* (2009.01)
   *H04W 4/40* (2018.01)

(52) U.S. Cl.
   CPC ... *H04W 28/0268* (2013.01); *H04W 28/0967* (2020.05); *H04W 48/18* (2013.01); *H04W 4/40* (2018.02)

(58) Field of Classification Search
   CPC ... H04W 28/02; H04W 28/0268; H04W 4/30; H04W 4/40; H04W 4/42; H04W 4/44; H04W 4/46; H04W 4/48; H04W 28/09; H04W 28/0958; H04W 8/00; H04W 8/18; H04W 8/22; H04W 48/00; H04W 48/18
   See application file for complete search history.

(56) References Cited

U.S. PATENT DOCUMENTS

| | | | |
|---|---|---|---|
| 2016/0196527 A1* | 7/2016 | Bose | G06Q 10/0832 705/332 |
| 2020/0077357 A1* | 3/2020 | Park | H04W 76/22 |
| 2020/0084691 A1* | 3/2020 | Wallentin | H04W 76/27 |
| 2020/0107229 A1* | 4/2020 | Liu | H04W 36/08 |
| 2020/0260334 A1* | 8/2020 | Gangakhedkar | H04L 45/302 |
| 2020/0267085 A1* | 8/2020 | Nie | H04L 12/4625 |
| 2021/0127299 A1* | 4/2021 | Vakeesar | H04W 36/0044 |
| 2021/0258818 A1* | 8/2021 | Jung | H04W 28/0268 |
| 2021/0306886 A1* | 9/2021 | Jung | H04B 17/373 |
| 2021/0377810 A1* | 12/2021 | Condoluci | H04W 28/12 |

FOREIGN PATENT DOCUMENTS

| | | | | |
|---|---|---|---|---|
| WO | WO-2010001373 A1 * | 1/2010 | | H04W 36/30 |
| WO | WO-2015193727 A1 * | 12/2015 | | H04W 4/021 |
| WO | 2019081026 A1 | 5/2019 | | |
| WO | 2020147927 A1 | 7/2020 | | |

OTHER PUBLICATIONS

Huawei et al., "KI#15: Clarification of Sol. 23," 3GPP TSG-SA WG2 Meeting #131, Santa Cruz de Tenerife, Spain, S2-1902156, Total 6 pages, 3rd Generation Partnership Project, Valbonne, France (Feb. 25-Mar. 1, 2019).

LG Electronics et al., "TS 23.287 Potential QoS change notification to assist Application Adjustment," SA WG2 Meeting #133, Reno, Nevada, USA, S2-1905137, Total 6 pages, 3rd Generation Partnership Project, Valbonne, France (May 13-17, 2019).

"Solution proposal on the key issue#15," SA WG2 Meeting #129, S2-1810595 (revision of S2-18xxxx), Dongguan, China, pp. 1-4, 3rd Generation Partnership Project, Valbonne, France (Oct. 15-19, 2018).

"KI#15: Update of Solution 29," 3GPP TSG-SA WG2 Meeting #132, S2-1903754 (was S2-190xxxx), Xi'an, People's Republic of China, Total 4 pages, 3rd Generation Partnership Project, Valbonne, France (Apr. 8-12, 2019).

"5G Automotive Association; Working Group System Architecture and Solution Development; Architectural Enhancements for Providing QoS Predictability in C-V2X," 5GAA [Draft] TR A-190062, pp. 1-73, Munich, Germany (Mar. 2019).

"3rd Generation Partnership Project; Technical Specification Group Services and System Aspects; Architecture enhancements for 5G System (5GS) to support Vehicle-to-Everything (V2X) services (Release 16)," 3GPP TS 23.287 V1.0.0, pp. 1-47, 3rd Generation Partnership Project, Valbonne, France (May 2019).

"3rd Generation Partnership Project; Technical Specification Group Services and System Aspects; Architecture enhancements for 5G System (5GS) to support network data analytics services (Release 16)," 3GPP TS 23.288 V0.4.0, pp. 1-48, 3rd Generation Partnership Project, Valbonne, France (Apr. 2019).

"3rd Generation Partnership Project; Technical Specification Group Services and System Aspects; System Architecture for the 5G System; Stage 2 (Release 16)," 3GPP TS 23.501 V16.0.2, pp. 1-317, 3rd Generation Partnership Project, Valbonne, France (Apr. 2019).

"3rd Generation Partnership Project; Technical Specification Group Services and System Aspects; Procedures for the 5G System; Stage 2 (Release 16)," 3GPP TS 23.502 V16.0.2, pp. 1-419, 3rd Generation Partnership Project, Valbonne, France (Apr. 2019).

"3rd Generation Partnership Project; Technical Specification Group Services and System Aspects; Policy and Charging Control Framework for the 5G System; Stage 2 (Release 16)," 3GPP TS 23.503 V16.0.0, pp. 1-84, 3rd Generation Partnership Project, Valbonne, France (Mar. 2019).

"3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786 V16.0.0, pp. 1-118, 3rd Generation Partnership Project, Valbonne, France (Mar. 2019).

"3rd Generation Partnership Project; Technical Specification Group Services and System Aspects; Study of Enablers for Network Automation for 5G (Release 16)," 3GPP TR 23.791 V16.1.0, pp. 1-124, 3rd Generation Partnership Project, Valbonne, France (Mar. 2019).

"Solution#29 update," 3GPP TSG-SA WG2 Meeting #132, S2-1904450 (Revision of S2-1904446, 4434, 3316), Xi'an, China, Total 5 pages, 3rd Generation Partnership Project, Valbonne, France (Apr. 8-12, 2019).

"LS Reply to 3GPP on Time-Criticality of In-Advance QoS Notification," 3GPP TSG-SA WG2 Meeting #132, S2-1904824 (was S2-1904452, 3756, 2158), Xi'an, People's Republic of China, Total 1 page, 3rd Generation Partnership Project, Valbonne, France (Apr. 8-12, 2019).

"3rd Generation Partnership Project; Technical Specification Group Services and System Aspects; Service requirements for V2X services; Stage 1 (Release 15)," 3GPP TS 22.185 V15.0.0, pp. 1-14, 3rd Generation Partnership Project, Valbonne, France (Jun. 2018).

"3rd Generation Partnership Project; Technical Specification Group Services and System Aspects; Enhancement of 3GPP support for V2X scenarios; Stage 1 (Release 16)," 3GPP TS 22.186 V16.2.0, pp. 1-18, 3rd Generation Partnership Project, Valbonne, France (Jun. 2019).

"3rd Generation Partnership Project; Technical Specification Group Services and System Aspects; Study on enhancement of 3GPP Support for 5G V2X Services (Release 16)," 3GPP TR 22.886 V16.2.0, pp. 1-76, 3rd Generation Partnership Project, Valbonne, France (Dec. 2018).

* cited by examiner

300

- Receive a request for the IQN from an IQN recipient. — 301
- Obtain configuration information and/or subscription information associated with the IQN recipient. — 302
- Determine whether or not there exists a corresponding PQCN subscription and make the corresponding PQCN subscription if the PQCN subscription does not exist. — 303
- Send a request for the PQCN subscription. — 304
- Map the request for the IQN to the existing PQCN subscription. — 305
- Receive a PQCN associated with the IQN recipient. — 306
- Associate the PQCN with the IQN recipient based on the mapping. — 307
- Determine that a predicted value of QoS for the IQN recipient does not meet a second threshold. — 308
- Send an IQN to the IQN recipient. — 309

Establish the PQCN subscription matching a location, a required QoS and at least one of: the configuration information or subscription information associated with an IQN recipient.   401

Receive from a first radio network node a request for a PQCN subscription, wherein the request for the PQCN subscription comprises the first threshold and at least one of: configuration or subscription information associated with the IQN recipient.   402

Send a PQCN associated with the IQN recipient to a first radio network node (190) for assisting application adjustment.   403

Fig. 4

POTENTIAL QUALITY OF SERVICE (QOS) CHANGE NOTIFICATION METHODS AND NODES FOR ASSISTING APPLICATION ADJUSTMENT

CROSS-REFERENCE TO RELATED APPLICATIONS

This application is a continuation of International Application No. PCT/EP2019/065850, filed on Jun. 17, 2019, the disclosure of which is hereby incorporated by reference in its entirety.

FIELD

Implementations described herein generally relate to a first and a second radio network nodes, and methods therein. Furthermore, a computer program and a computer-readable storage medium are also provided herein. In particular, a mechanism is herein described for assisting application adjustment.

BACKGROUND

Vehicle-to-everything (V2X) communication is the passing of information from a vehicle to any entity that may affect the vehicle, and vice versa. To support reliable V2X communication in the high mobility environments, enhanced wireless communication network has been developed by 3rd Generation Partnership Project (3GPP).

Enhanced wireless communication network, e.g., 5G System (5GS), is designed to support V2X services identified in 3GPP specification TR 22.886, based on vehicular services requirements as defined in 3GPP specifications TS 22.185 and TS 22.186. For instance, enhanced wireless communication network will assist application adjustment.

Each V2X service, as defined in 3GPP specification TS 22.186, may be provided with different application configurations, such as Levels of Automation (SLA), inter-vehicle gap, etc. Each application configuration may have a different quality of service (QoS) requirement. As a consequence, an application may adjust its application configuration in case of QoS change according to the new QoS that can be delivered.

Considering the requirements of V2X service, it may be important for some application(s) to be notified about a potential change in the delivered QoS in advance, in order to be able to dynamically adjust its application configuration. The notification may consider the locations in which the user equipment (UE) is likely to be driving for a given time period. Thus, the enhanced wireless communication network will support potential QoS change notification (PQCN) to assist application adjustment.

Traditional cellular technologies have necessary mechanisms in place for the network to react in terms of dealing with QoS degradations. Such reactive network behaviour is good enough for most of legacy applications. However, the prior wireless communication network is not enough to support the V2X application, such as a Tele-Operated Driving (TOD) application, where dropping a session without any warning can question the functional safety of such a V2X application. Suppose in the case of TOD where a car is driven at 100 km/h by a remote driver who may require 4k video stream, dropping a session without any pre-warning can be disastrous. This because application reaction times in case of a QoS change for V2X applications are not comparable to pure software reaction times, since it may involve mechanical reactions such as changing lane, reducing speed or even stopping the car in some cases in order to preserve safety. Hence, in order for wireless communication network to be really helpful to at least V2X applications, a pro-active behaviour is expected. With such a proactive behaviour, a network can generate In-advance QoS change notifications (IQNs) in case it is predicted that the pre-agreed QoS requirements can no longer be met so that the V2X application can prepare by dynamically adjusting its configuration accordingly.

According to the prior art wireless communication network, a V2X application Server is expected to request analytics information from a network data analytics function (NWDAF) regarding potential QoS change for a particular geographical area with a help of a network exposure function (NEF). In return, the NWDAF provides analytic information in terms of where QoS is predicted change to the AF. For this, the NWDAF may rely on an administration and maintenance (OAM) for analytical data.

FIG. 1 is a signalling diagram illustrating a PQCN to assist application adjustment. As indicated in FIG. 1, one or more user equipment (UE) gets a V2X application function (AF) to generate analytics exposure subscription request to a network data analytics function (NWDAF). For this purpose, a UE passes information such as V2X application, path, path start time and QoS requirements on to the V2X AF, e.g., V2X application server (AS). The path can be a form of geographic coordinates to reflect a list of waypoints. The AF can interact with NWDAF through a network exposure function (NEF), if required. Based on analytical data collected from an administration and maintenance (OAM), the NWDAF will generate a notification in case if it is predicted that QoS change may potentially happen. On receiving such a notification from the AF V2X application adjustment can happen in a UE.

As shown above, the prior solution is capable of delivering coarse-granular IQN which is road segment specific. This is because it assumes that all UEs along the same road segment will be subject to the same QoS within a predetermined time window. Hence whenever the network detects a potential QoS change, e.g., degradation, which may affect a specific QoS requirement in a specific road segment, it will generate a potential QoS change notification that will be sent to the AF assuming that all UEs using the same service in that location will be affected in the same way during that predetermined time window. It shall be reminded that IQN notifications may have real impact on the driving behaviour of a vehicle. If an IQN with a potential QoS drop is received by a Tele Operated vehicle, the application may reduce speed (sometimes even abruptly, depending on driving conditions) or take it to a complete stop in order to preserve safety. Depending on the current speed of the vehicle this can lead to consequence that at a minimum may impact unnecessarily the quality of driving experience, if not more serious consequences, e.g., passengers inside the vehicle could suffer a mechanical shock because of a sudden stop.

It would be desired to find a manner to providing a fine-granular IQN for assisting application adjustment.

SUMMARY

Embodiments of the disclosure provide a fine-granular IQN for assisting application adjustment. Various features of the embodiments are described in the independent claims. Further features of the embodiments are described in the dependent claims, the description and the figures.

According to a first aspect, a first radio network node is provided. The first radio network node is configured to receive a potential quality of service change notification, PQCN, from a second radio network; associate the PQCN with an in-advance quality of service prediction notification, IQN, recipient; wherein the association is based on a mapping between a request for an IQN from the IQN recipient and an existing PQCN subscription, wherein the mapping is established based on a location, a required quality of service, QoS, and at least one of: configuration information associated with the IQN recipient or subscription information associated with the IQN recipient; and send an IQN to the IQN recipient for assisting the application adjustment.

Since the configuration and subscription information is IQN recipient specific, a fine-granular IQN, i.e., IQN recipient specific IQN, is thereby enabled by virtual of the association based on the mapping which is established based on such IQN recipient specific information.

In a first possible implementation of the first radio network node according to the first aspect, the first radio network node may be further configured to map the request for the IQN from the IQN recipient to the existing PQCN subscription, based on the location, the required quality of service, QoS and at least one of: the configuration information associated with the IQN recipient or subscription information associated with the IQN recipient.

By mapping the IQN recipient specific configuration and subscription information to the existing PQCN subscription, associating a PQCN to a specific IQN recipient is thus made possible.

In a second possible implementation of the first radio network node according to the first aspect, or the first implementation thereof, the configuration information associated with the IQN recipient comprises at least one of: radio frequency capability, configured network slice selection assistance information (NSSAI), radio access technology type; and/or the subscription information associated with the IQN recipient comprises at least one of: a time window, a subscriber category and an allowed NSSAI.

The advantageous technical effect brought herein is that the triggering of false IQNs will be avoided, or at least reduced. Taking the above subscription and/or configuration information of a specific IQN recipient into account, it is assured that the IQN recipient will receive the right IQN, chances to receive false IQNs will be avoided or minimized accordingly.

In a third possible implementation of the first radio network node according to the first aspect, or any implementation thereof, the first radio network node may also be configured to determine whether or not there exists a PQCN subscription matching the location, the required QoS and at least one of: the configuration information or the subscription information associated with the IQN recipient; make the PQCN subscription if no matching PQCN subscription exists; and send to the second radio network node a request for the PQCN subscription, wherein the request for the PQCN subscription comprises a first threshold and at least one of: configuration information or subscription information associated with the IQN recipient.

By establishing the PQCN subscription it is enabled that each IQN recipient will be matched to a proper PQCN subscription.

In a fourth possible implementation of the first radio network node according to the first aspect, or any implementation thereof, the first radio network node may also be configured to send the IQN to the IQN recipient when a predicted of QoS value does not meet a second threshold.

The PQCN comprises at least one of: an indication indicating whether a predicted QoS value will be higher or lower than a first threshold; or difference between the predicted QoS value for the IQN recipient and the first threshold.

It is thereby assured that the IQN is sent to the IQN recipient when the QoS has changed more than the threshold limit. Thereby, transmission of excessive and/or redundant IQN messages is avoided.

In a fifth possible implementation of the first radio network node according to the first aspect, or any implementation thereof, the first radio network node may be configured to receive the request for the IQN which comprises at least one of: the location associated with the IQN recipient and the required QoS associated with the IQN recipient.

The request for the IQN will advantageously trigger the PQCN subscription.

In a sixth possible implementation of the first radio network node according to the first aspect, or any implementation thereof, the first radio network node may be configured to update, when the QoS related to the IQN recipient updates, the mapping between the IQN request from the IQN recipient and the corresponding PQCN subscription.

Updating the mapping will assure that the IQN recipient will receive the right IQN, thus chances to receive false IQNs will be reduced or completely avoided.

According to a second aspect, a method is provided in a first radio network node. The method comprises the step of receiving a potential quality of service change notification, PQCN, from a second radio network; associating the PQCN with an in-advance quality of service prediction notification, IQN, recipient; wherein the association is based on a mapping between a request for an IQN from the IQN recipient and an existing PQCN subscription, wherein the mapping is established based on a location, a required quality of service, QoS, and at least one of: configuration information associated with the IQN recipient or subscription information associated with the IQN recipient; and sending an IQN to the IQN recipient for assisting the application adjustment.

Since the configuration and subscription information is IQN recipient specific, a fine-granular IQN, i.e., IQN recipient specific IQN, is thereby enabled as the association is based on IQN recipient specific information.

In a first possible implementation of the method according to the second aspect, the method also comprises the step of mapping the request for the IQN from the IQN recipient to the existing PQCN subscription, based on the location, the required quality of service, QoS and at least one of: the configuration information associated with the IQN recipient or subscription information associated with the IQN recipient.

By mapping the IQN recipient specific configuration and subscription information to the existing PQCN subscription, associating a PQCN to a specific IQN recipient is thus enabled.

In a second possible implementation of the method according to the second aspect, or any implementation thereof, the configuration information associated with the IQN recipient comprises at least one of: radio frequency capability, configured network slice selection assistance information (NSSAI), radio access technology type; and/or the subscription information associated with the IQN recipient comprises at least one of: a time window, a subscriber category and an allowed NSSAI.

By doing this, the triggering of false IQNs will be avoided, reduced or minimized. Taking the above subscription and/or configuration information of a specific IQN recipient into account, it is assured that the IQN recipient will receive the right IQN, chances to receive false IQNs will be avoided or minimized accordingly.

In a third possible implementation of the method according to the second aspect, or any implementation thereof, the method may also comprise the step of: determining whether or not there exists a PQCN subscription matching the location, the required QoS and at least one of: the configuration information or the subscription information associated with the IQN recipient; making the PQCN subscription if no matching PQCN subscription exists; and sending to the second radio network node a request for the PQCN subscription, wherein the request for the PQCN subscription comprises a first threshold and at least one of: configuration information or subscription information associated with the IQN recipient.

By establishing the PQCN subscription it is enabled that each IQN recipient will be matched to a proper PQCN subscription.

In a fourth possible implementation of the method according to the second aspect, or any implementation thereof, the method may also comprise the step of sending the IQN to the IQN recipient when a predicted of QoS value does not meet a second threshold. The PQCN comprises at least one of: an indication indicating whether a predicted QoS value will be higher or lower than a first threshold; or difference between the predicted QoS value for the IQN recipient and the first threshold.

It is thereby assured that the IQN is sent to the IQN recipient when the QoS has changed more than the threshold limit. Thereby, transmission of excessive and/or redundant IQN messages is avoided.

In a fifth possible implementation of the method according to the second aspect, or any implementation thereof, the method may also comprise the step of receiving the request for the IQN which comprises at least one of: the location associated with the IQN recipient and the required QoS associated with the IQN recipient.

The request for the IQN will advantageously trigger the PQCN subscription.

In a sixth possible implementation of the method according to the second aspect, or any implementation thereof, the method may also comprise the step of updating, when the QoS related to the IQN recipient updates, the mapping between the IQN request from the IQN recipient and the corresponding PQCN subscription.

Updating the mapping will assure that the IQN recipient will receive the right IQN, thus chances of receiving false IQNs will be minimized or reduced.

According to a third aspect, a second radio network node is provided. The second radio network node is configured to send a potential quality of service change notification, PQCN, which is associated with an in-advance quality of service prediction notification, IQN, recipient, to a first radio network node for assisting the application adjustment. The PQCN notifies that a predicted quality of service, QoS, value related to the IQN recipient changes from a first threshold, wherein the predicted QoS value is determined based on at least one of: the configuration information or subscription information associated with the IQN recipient.

A fine-granular IQN, i.e., IQN recipient specific IQN, is enabled since the prediction is based the IQN recipient specific configuration or subscription information.

In a first possible implementation of the second radio network node according to the third aspect, the PQCN comprises at least one of an indication indicating whether the predicted QoS value will be higher or lower than the first threshold; or difference between the predicted QoS value and the first threshold.

By providing the indication and the difference, the PQCN producer node will be aware of the predicted QoS value, thereby generation of corresponding IQN is facilitated.

In a second possible implementation of the second radio network node according to the third aspect, or the first implementation thereof, the second radio network node may be further configured to receive from the first radio network node a request for a PQCN subscription, wherein the request for the PQCN subscription comprises the first threshold and at least one of: configuration information or subscription information associated with the IQN recipient.

By receiving the IQN recipient specific threshold and configuration information or subscription information, the second radio network node will be able to make an IQN recipient specific QoS prediction.

In a third possible implementation of the second radio network node according to the third aspect, or any implementation thereof, the second radio network node may be further configured to establish the PQCN subscription matching a location, a required QoS and at least one of: the configuration information or subscription information associated with the IQN recipient.

By establishing the IQN recipient specific PQCN subscription, the second radio network node will also be able to make an IQN recipient specific QoS prediction.

According to a fourth aspect, a method is provided in a second radio network node. The method comprises the step of sending a potential quality of service change notification, PQCN, which is associated with an in-advance quality of service prediction notification, IQN, recipient, to a first radio network node for assisting the application adjustment. The PQCN notifies that a predicted quality of service, QoS, value related to the IQN recipient changes from a first threshold, wherein the predicted QoS value is determined based on at least one of: the configuration information or subscription information associated with the IQN recipient.

A fine-granular IQN, i.e., IQN recipient specific IQN, is enabled since the prediction is based the IQN recipient specific configuration or subscription information.

In a first possible implementation of the method according to the fourth aspect, the PQCN comprises at least one of: an indication indicating whether the predicted QoS value will be higher or lower than the first threshold; or difference between the predicted QoS value and the first threshold.

By providing the indication and the difference, the PQCN producer node will be aware of the predicted QoS value, thereby it will be facilitated to generate the corresponding IQN.

In a second possible implementation of the method according to the fourth aspect, or the first implementation thereof, the method also comprises the step of receiving from the first radio network node a request for a PQCN subscription, wherein the request for the PQCN subscription comprises the first threshold and at least one of: configuration information or subscription information associated with the IQN recipient.

By receiving the IQN recipient specific threshold and configuration information or subscription information, the second radio network node will be able to make an IQN recipient specific QoS prediction.

In a third possible implementation of the method according to the fourth aspect, or any implementation thereof, the method also comprises the step of establishing the PQCN subscription matching a location, a required QoS and at least one of: the configuration information or subscription information associated with the IQN recipient.

According to a fifth aspect, a computer program is provided. The computer program comprises instructions, which, when executed on at least one processor, cause the first radio network node to perform a method according to the second aspect, or any implementations thereof, and/or cause the second radio network node to perform a method according to the fourth aspect, or any implementations thereof.

Other objects, advantages and novel features of the aspects of the disclosure will become apparent from the following detailed description.

BRIEF DESCRIPTION OF THE DRAWINGS

Various embodiments are described in more detail with reference to attached drawings, illustrating examples of embodiments of the disclosure in which:

FIG. 3 is a flow chart illustrating a method in a first radio network node according to an example.

FIG. 4 is a flow chart illustrating a method in a second radio network node according to an example.

DETAILED DESCRIPTION

Embodiments of the disclosure described herein are defined as a first radio network node, a second radio network node and methods therein, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

As part of the innovative process of the embodiments, the technical problems of prior art will be discussed herein in more details.

Figure 1:
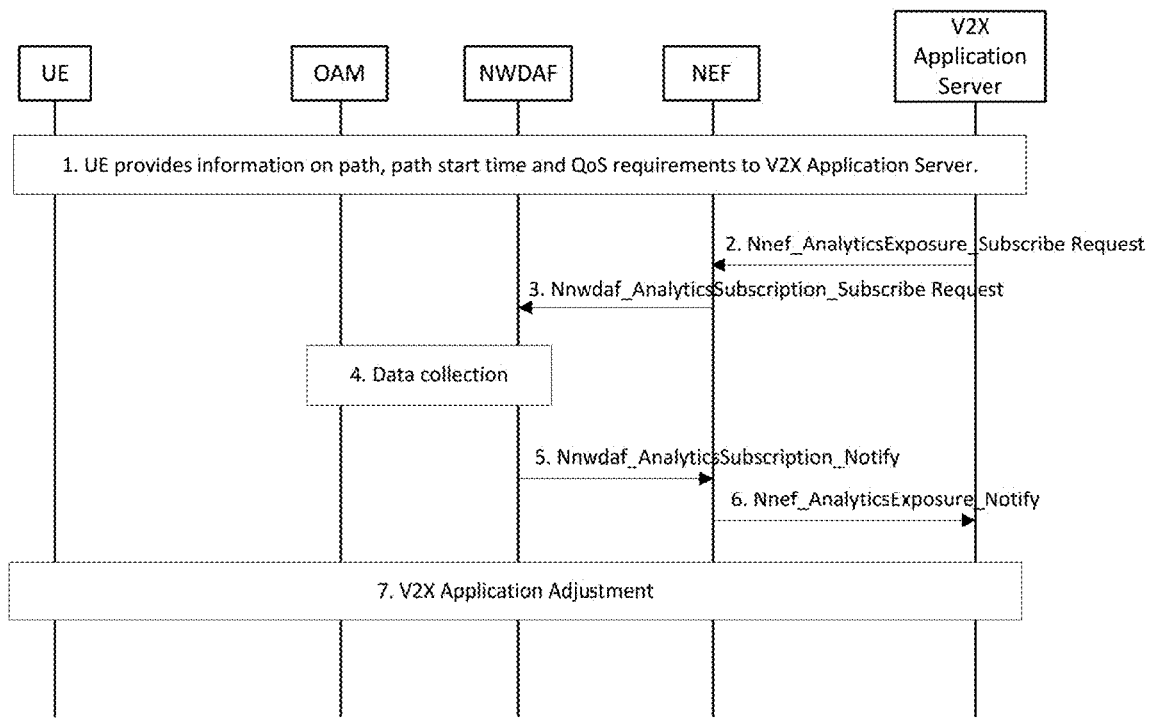
FIG. 1 is a signalling diagram illustrating a PQCN to assist application adjustment.

FIG. 1 illustrates a signalling diagram illustrating a PQCN to assist application adjustment.

UEs are different in terms of their QoS requirements and provisioning expectations depending especially on their capabilities, subscription, and exact location. This means that the actual QoS that can be provisioned to different UEs in the same road segment can be different. This is true even if two UEs run the same type of V2X application. For example, two UEs may be interested in a TOD Application and one UE can support one radio access technology (RAT) type, e.g., 3GPP Rel-15 new radio (NR), whereas another UE can support another RAT type, e.g., 3GPP Rel-16 NR. Further, according to the SLA or subscription category one UE can be a privileged customer when compared to the other. Other possible causes for UE to experience different QoS (even when accessing the same V2X Services in the same road segment) are the configured and allowed NSSAI, which may lead to registering to different single NSSAI (S-NSSAI). All this means that the network's obligation to provide QoS may vary between different UEs depending at least on their SLA. The prior art fails to realise such heterogeneity and can lead to inaccurate coarse-granular IQN generation.

It is still not clear in the prior solution when AF makes subscriptions to an NWDAF. It is still not sure whether such a subscription is always triggered by a UE. It is also not clear when and how the AF will provide the information received in the PQCN to the UE and in which format In addition, the prior solution is only able to provide a potential QoS change notification, which does not specify the entity of such QoS change (not even the order of magnitude). Further, the prior art is not scalable.

The prior solution may issue a PQCN to the AF any time the QoS is predicted to change in a specific area, or according to previously specified Analytics Filters of the NWDAF subscription. However, it is not capable of informing the application running on the entity of such QoS change. Such information is needed by the application in order to select the appropriate application reaction to the potential QoS change.

In the prior solution the potential QoS change is generated according to OAM information (or external info provided to the AF). The prior art does not consider the possibility to trigger the PQCN based on event information collected from SMF 140, for example events related to specific protocol data unit (PDU) Session termination, modification or establishment.

In the prior solution the AF provides the QoS requirements as part of the Analytics filters to the NWADF. The AF does not necessarily know the current QoS of the PDU Session of the UE, neither does it know when such QoS is explicitly modified, e.g., by a Policy Control Function (PCF).

In the wireless communication network, e.g., 5GS, the connectivity service provided between the UE and a data node (DN) is represented by the PDU Session. A PDU Session may contain one or more QoS Flows. The QoS Flow is the finest granularity of QoS differentiation in the PDU Session. However, the current PQCN is not UE-specific and is not related to any PDU Session or QoS flow.

The object of the embodiments herein is to obviate at least some of the above-mentioned disadvantages. The embodiments herein aim to provide a solution for assisting application adjustment. The embodiments herein propose to enhance the coarse-granular prior solution to generate fine-granular in-advance QoS change notifications to an IQN recipient, e.g., a UE. The embodiments provide an in-advance QoS change notification which is IQN recipient specific, e.g., a UE-specific. The in-advance QoS change notification may be generated based on QoS parameters such as 5G-specific QoS parameters, e.g., 5G QoS Indicator (5QI).

Still other objects and features may become apparent from the following detailed description, considered in conjunction with the accompanying drawings. It is to be understood, however, that the drawings are designed solely for purposes of illustration and not as a definition of the limits of the herein disclosure embodiments, for which reference is to be made to the appended claims. Further, the drawings are not necessarily drawn to scale and, unless otherwise indicated, they are merely intended to conceptually illustrate the structures and procedures described herein.

Figure 2:
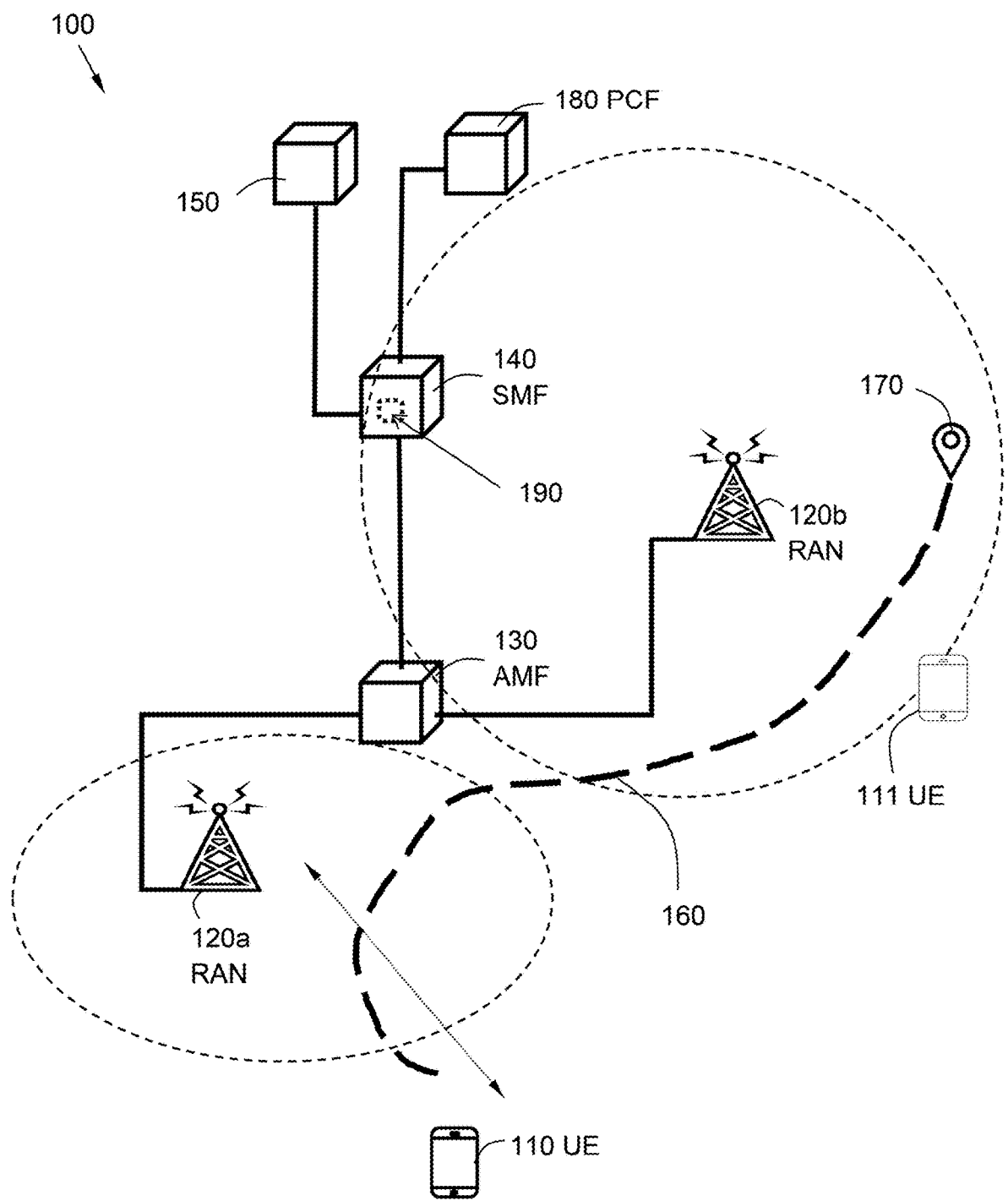
FIG. 2 is a diagram illustrating a wireless communication network according to an embodiment, and a UE moving along a flight path or route.

FIG. 2 is a diagram illustrating a wireless communication network 100 according to an embodiment, and a UE 110 moving along a flight path or route 160 towards a destination 170.

The expressions "wireless communication network", "wireless communication system" and/or "cellular telecommunication system" may within the technological context of this disclosure sometimes be utilized interchangeably. The wireless communication network 100 may use a number of different technologies, such as Wi-Fi, long term evolution (LTE), LTE-Advanced, fifth generation (5G) system, wideband code division multiple access (WCDMA), global system for mobile communications (GSM)/enhanced data rate for GSM evolution (EDGE), worldwide interoperability for microwave access (WMax), or ultra mobile broadband (UMB), just to mention a few possible implementations. Embodiments herein relate to recent technology trends that are of particular interest in a 5G context, however, embodiments are also applicable in further development of the existing wireless communication systems such as WCDMA and LTE.

The wireless communication network 100 comprises various radio network nodes for providing wireless communication for a plurality of UE 110, 111.

The wireless communication network 100 comprises an IQN consumer node and an IQN producer node. The IQN producer node produces in-advance QoS prediction notification upon a request from the IQN consumer node. As a non-limiting purpose, the UE will be used as an example of the IQN consumer node in this disclosure. Sometimes an IQN distribution framework is provided, supporting multiple IQN producer nodes and multiple IQN consumer nodes. Thereby, a solution is provided for the network 100 to assemble and deliver IQNs to multiple IQN consumer nodes.

Additionally, the wireless communication network 100 also comprises a PQCN consumer node 190 and a PQCN producer node 150. The PQCN producer node 150 produces potential QoS change notification upon a request from the PQCN consumer node 190. The term PQCN consumer node may also referred to as an aggregator, an aggregator network function (NF), aggregator NF/AF, an aggregator entity etc. As a non-limiting purpose, the NWDAF will be used as an example of the PQCN producer node 150 to illustrate the embodiments herein. The PQCN consumer node 190 meanwhile also plays the role of the IQN producer node.

The PQCN consumer node 190 may reside in the AF or alternatively in the Session Management Function (SMF) 140. The SMF 140 is a network control node responsible for PDU Session management, as well as QoS management. When a PQCN is subscribed by the SMF 140, this NF may have a good and up to date knowledge of the QoS that is policed on a PDU Session of a UE, and therefore is in a better position to request such PQCN subscription on behalf of UE 110.

The AF would not know QoS profiles associated with each QoS flow of a PDU session. Hence, the AF would subscribe per high-level QoS requirements that will be later translated to 5G-specific QoS parameters, e.g., 5QI, and QoS characteristics, e.g., PDB.

The UE 110 may be moving, e.g., when situated in a vehicle, along the flight path 160 towards the destination 170. The UE 110 may for example comprise an integrated communication device of a vehicle, e.g., configured for Vehicle-to-Vehicle/Vehicle-to-Everything (V2V/V2X) communication with other vehicles, or other environmental structures. However, in some other embodiments, the UE 110 may be a cellular mobile telephone or similar communication device, used by a user which is moving on a vehicle such as a train or an autonomous car, etc.

When moving between different locations along the flight path 160, the UE 110 may make a hand over from a source serving cell 120a, to a target serving cell 120b. These cells 120a, 120b may also be referred to as access points of a Radio Access Network (RAN).

Information concerning the UE 110 such as the position of the UE 110 and/or the flight path 160 of the UE 110 may be determined. By knowing or estimating the UE flight path 160, it becomes possible to predict serving cells 120a, 120b along the flight path 160. It also becomes possible to predict a change in QoS of a PDU Session of the UE 110, in-advance.

This is possible by an analysis of statistics collected of previous QoS delivered on various positions along the flight path 160 to previous/other UEs having passed the same way, e.g., by knowledge of the available resources on the specific network 100 or network slice; by the type of UE subscription; by the type of PDU Session and QoS Flows in the PDU Session in question to the specific UE 110, by the information on the current and predicted weather; by the information on the position and predicted positions of other UEs in the same network 100 or network slice; by the knowledge of the status of each network node 120a, 120b, 130, 140, 150, 190 concerning resource availability; and/or by the information of predicted events which may affect the number of UEs in the locations in question as well as the number and type of PDU Sessions or QoS flows that are or may be requested by those UEs in the specific network 100 or network slice.

The wireless communication network 100 may also comprise an Access and Mobility Management Function (AMF) network node 130 and a SMF 140 network node 140. Further, the wireless communication network 100 may comprise a NWDAF. The NWDAF is responsible for collecting network analytic information upon request to assemble n PQCN and sending the PQCN to a PQCN consumer node 190, in order to trigger sending of the IQN to the IQN consumer node/recipient.

The source cell 120a, the target cell 120b, the AMF 130, the SMF 140, and/or the NWDAF may all be referred to as network nodes 120a, 120b, 130, 140, 150, 190 in a common term. Some of these network nodes 120a, 120b, 130, 140, 150, 190 such as the AMF 130, the SMF 140, and/or the NWDAF may also be referred to as core network nodes.

Embodiments concerning the herein provided solution are focused primarily on the issue of prediction delivery functionality, i.e., how to deliver the consumer specific prediction to the IQN consumer nodes.

FIG. 3 is a flow chart illustrating a method 300 in a first radio network node 190, e.g., a PQCN consumer node according to an embodiment for assisting application adjustment. The term "first radio network node" herein refers to the above PQCN consumer node 190 such as either a SMF 140 and/or AF. The method 300 may comprise a number of steps or actions. However, some of these steps as shown with the dash lines in the Figure may be performed solely in some alternative embodiments. Further, the described steps may be performed in a somewhat different chronological order than the numbering suggests.

Action 301

Optionally, the first radio network node 190 may receive a request for an IQN which comprises at least one of: a location associated with an IQN recipient such as a UE 110 (the expressions IQN recipient and UE may be used interchangeably) and a required QoS associated with the IQN recipient 110. The request for the IQN may also comprise information concerning the flight path 160. The QoSs required by the IQN recipients 110 may be different because of different the IQN recipients' configuration, capabilities and subscription information.

Action 302

Action 302 is optional. The first radio network node 190 may obtain information, which may affect the IQN recipient's QoS at the position and/or flight path 160.

For instance, the first radio network node 190 may obtain configuration information and/or subscription information associated with the IQN recipient 110. The configuration information associated with the IQN recipient 110 may comprise at least one of: radio frequency capability, configured network slice selection assistance information, NSSAI, radio access technology type. The subscription information associated with the IQN recipient 110 may comprise at least one of: a time window, a subscriber category and an allowed NSSAI.

Action 303

This action is optional. The first radio network node 190 may determine whether or not there exists a PQCN subscription matching the location, the required QoS and at least one of: the configuration information or the subscription information associated with the IQN recipient 110. The first radio network node 190 may make the PQCN subscription if no matching PQCN subscription exists in some embodiments.

Action 304

Optionally, the first radio network node 190 may send to the second radio network node 150 a request for the PQCN subscription.

According to the embodiments herein, the request for the PQCN subscription comprises the first threshold and at least one of: configuration information or subscription information associated with the IQN recipient 110.

Additionally, the request for the PQCN subscription may also comprise: Analytic ID="Potential QoS change"; and Analytic Filter Information, such as QoS requirements and Location information, e.g., Geographical Area(s), etc.

The request for the PQCN subscription may be sent via an NEF and implemented as either a Nwdaf_AnalyticsSubscription_Subscribe Request or a Nnef_AnalyticsExposure_Subscribe Request. However, when the first radio network node 190 is the SMF 140, a Nwdaf_AnalyticsSubscription_Subscribe Request may be issued directly from the SMF 140 to the second radio network node 150 and not necessarily through the NEF.

Action 305

The first radio network node 190 may map a request for an in-advance quality of service prediction notification, IQN, from an IQN recipient 110 to an existing PQCN subscription, based on the location, the required quality of service, QoS and at least one of: the configuration information associated with the IQN recipient 110 or subscription information associated with the IQN recipient 110.

The first radio network node 190 may update, when the PDU session or QoS related to the IQN recipient updates, the mapping between the IQN request 110 from the IQN recipient 110 and the corresponding PQCN subscription. Alternatively, or additionally, the mapping may also be updated when the IQN recipient 110 moves along the flightpath 160 to a new location.

That is because each PQCN subscription corresponds to a specific geographic area.

Action 306

The first radio network node 190 receives a PQCN from a second radio network node 150. Optionally, the PQCN comprises at least one of: an indication indicating whether a predicted QoS value will be higher or lower than a first threshold or difference between the predicted QoS value for the IQN recipient 110 and the first threshold. The PQCN may also comprise an indication of the geographic area where QoS change is likely to happen. More details regarding the PQCN will be discussed below.

Action 307

The first radio network node 190 associates the PQCN with the IQN recipient 110 based on the mapping. The PQCN comprises information related to QoS of the PDU session of the IQN recipient/UE 110.

Action 308

The first radio network node 190 may also determine that a predicted value of QoS for the IQN recipient 110 does not meet a second threshold. The second threshold may be the same or higher than a required QoS by the IQN recipient 110.

Action 309

The first radio network node 190 sends an IQN to the IQN recipient 110 according to the received PQCN. The IQN is delivered to one or more IQN recipients, e.g., the UE 110.

When the PQCN comprises at least one of: the indication indicating whether a predicted QoS value will be higher or lower than a first threshold or the difference between the predicted QoS value for the IQN recipient 110 and the first threshold, the first radio network node 190 may send the IQN to the IQN recipient 110 when the predicted value of QoS does not meet a second threshold. This action is optional. The required QoS value by the IQN recipient 110 may be configured as the second threshold. The second threshold and the first threshold may be given the same value according to some embodiments.

The IQN may comprise for example IQN type which comprises a PDU Session IQN or a QoS Flow IQN, and various identity references, e.g., the PDU Session Id for a PDU Session IQN; the PDU Session Id and the QoS Flow Id for a QoS Flow IQN. Further, the IQN may comprise predicted QoS such as IQN predicted parameter and/or IQN predicted value.

This predicted QoS value may not necessarily need to be one specific exact value, e.g., 14.5, but could rather be a value range or interval, e.g., 10-20 (arbitrary examples). Specification of the value range or interval may be agreed between IQN consumer node and IQN producer node or be specified within the IQN distribution policy.

Further the IQN content may comprise time values for the IQN, which may include any of the time when the QoS prediction takes place or becomes effective, and/or the time when the QoS prediction was generated. The IQN content may also comprise prediction accuracy. In case of a one-time QoS prediction request, the prediction validity time, may comprise a time period interval for how long the prediction that is received is considered to be valid.

The IQN may then cause the UE 110 or the V2X application running in the UE 110 to perform a further action when the QoS is predicted to deteriorate. For instance, in case the UE 110 is a part of an autonomous vehicle, the vehicle speed and/or inter-vehicular distance may be adapted based on the received IQN information. Another action may be to buffer information to be received in-advance, or to terminate a program or an application under controlled forms; and/or starting a new program or application.

FIG. 4 is a flow chart illustrating a method 400 in a second radio network node 150, i.e., the PQCN producer node, such as the NWDAF, PCF, and/or SMF 140 for assisting application adjustment according to an embodiment. The method 400 may comprise a number of steps or actions. However, some of these steps as shown with the dash lines may be performed solely in some alternative embodiments. Further, the described steps may be performed in a somewhat different chronological order than the numbering suggests.

Action 401

This action is only performed in certain embodiments. The second radio network node 150 may establish the PQCN subscription matching a location, a required QoS and at least one of: the configuration information or subscription information associated with the IQN recipient/UE 110.

Action 402

Optionally, the second radio network node 150 may further receive from the first radio network node 190 a request for a PQCN subscription as discussed above in action 306, wherein the request for the PQCN subscription comprises the first threshold and at least one of: configuration information or subscription information associated with the IQN recipient/UE 110.

Action 403

The second radio network node 150 sends a PQCN associated with the IQN recipient 110 to a first radio network node 190. The PQCN notifies that a predicted QoS value related to the IQN recipient 110 changes from a first threshold, wherein the predicted QoS value is determined based on at least one of: the configuration information or subscription information associated with the IQN recipient 110.

The PQCN may comprise at least one of: an indication indicating whether a predicted QoS value will be higher or lower than a first threshold or difference between the predicted QoS value for the IQN recipient 110 and the first threshold. In the prior art PQCN the above information related to the predicted value of QoS is not comprised, only information whether the predicted QoS will be different from the threshold included in the requirement.

The potential QoS change detected by the NWDAF may be based on the data from OAM, e.g., average UL/DL throughput, DRB accessibility/retainability, etc. Data collected from other NFs can be used as well.

The QoS at a specific location may change due to various reasons, like a network load, wireless impairment, weather, capabilities of a target cell 120b. Herein it is proposed to further take the configuration information, e.g., configured NSSAI, RAT Type and/or subscription information, e.g., subscription category, allowed NSSAI, associated with the IQN recipient into consideration. It means, in case that the network 100 in a specific location cannot provide a service which is aligned with the configuration information and/or subscription information associated with the IQN recipient 110, it will be predicted as a QoS change.

The PQCN may be sent when the statistics of QoS key performance indicators (KPIs) information in any position is below any of the threshold(s) comprised in the request for the PQCN for the time the UE 110 is expected to be in the position, compared to the QoS KPI that the UE 110 has negotiated for the ongoing PDU Session. The PQCN may be sent to the first radio network node 190 via the NEF. The PQCN may be implemented as either a Nwdaf_Analytics-Subscription_Notify or a Nnef_AnalyticsExposure_Notify.

Figure 5:
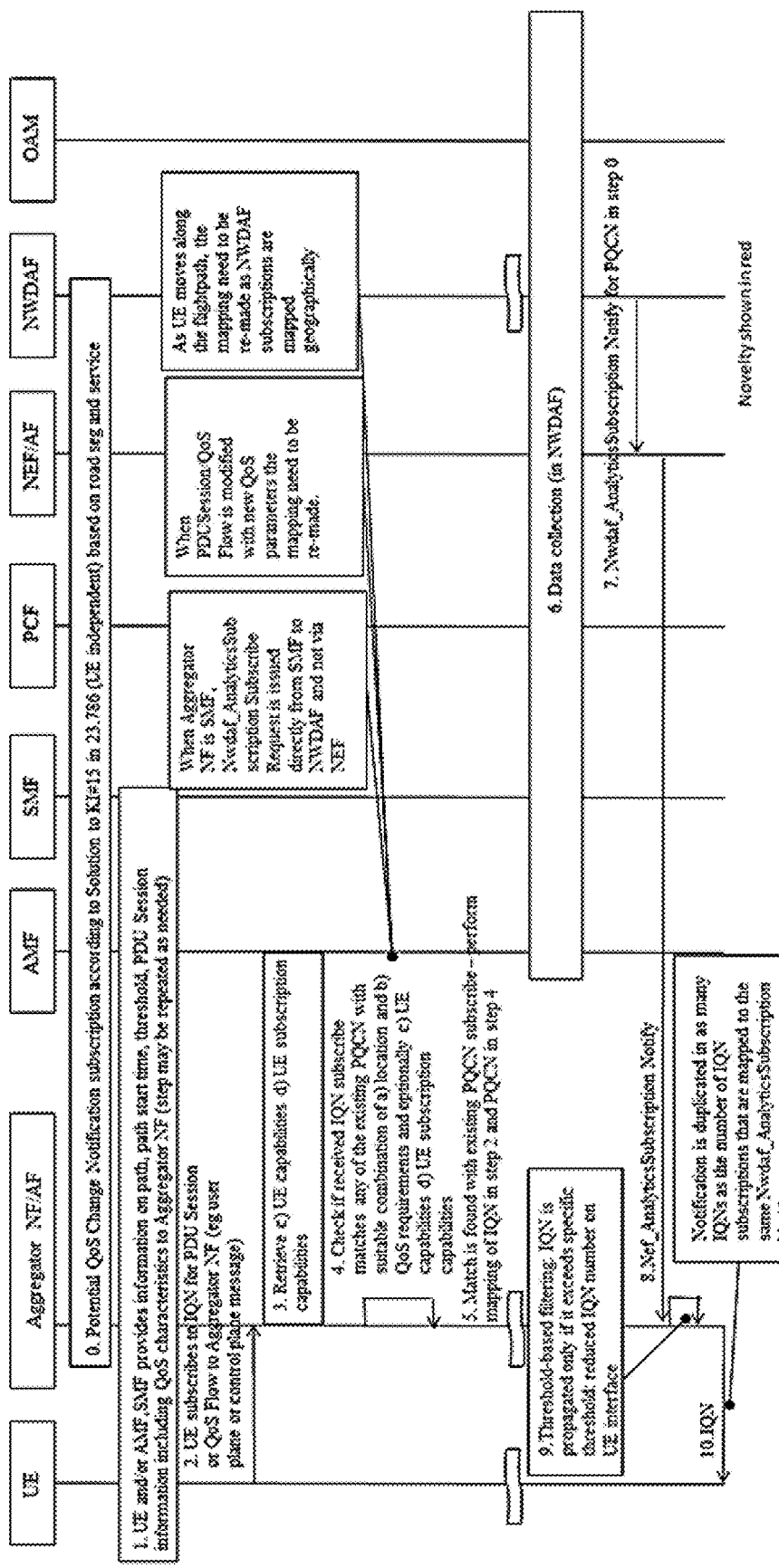
FIG. 5 is a combined flow chart and signalling scheme in a wireless communication network according to an example.

FIG. 5 is a combined flow chart and signalling scheme in a wireless communication network 100 according to an embodiment. The flow chart is related to a procedure at a bootstrap stage, i.e., configuration stage. At this stage, the IQN consumer node will establish a PDU Session with the wireless network 100. As a non-limiting purpose, the UE 110, aggregator NF/AF and NWDAF will be used as an example of the IQN consumer node, the PQCN consumer node 190 and the PQCN producer node 150 respectively in this embodiment.

The aggregator NF/AF makes PQCN subscription (step 0) with an NWDAF per service type, e.g., as characterised by QoS profile namely with 5QI, resource type such as Guaranteed Bit Rate (GBR) and non-GBR, per geographical location, e.g., road segment, per UE capability, e.g., Slice/RAT-type/frequencies/waveform/Carrier Aggregation (CA)/Dual Connectivity (DC) supported. Based on the traffic type expected on a given geographical area, e.g., road segment, based on past usage history, the aggregator NF/AF may make such a PQCN subscription at bootstrap. Hence, such a PQCN subscription is not influenced by individual UE session establishment. This is the pre-configuration happening at step 0 that is required for the rest of the solution to work. When Aggregator NF/AF is SMF 140, a Nwdaf_Analytics-Subscription Subscribe Request may be issued directly from SMF 140 to NWDAF and not necessarily through the NEF. When the UE 110 establishes a PDU Session with the wireless network 100, the wireless network 100, specifically, the first radio network node 190, may retrieve the IQN Notice period, how often the predicted location shall be reported by the UE 110 to the wireless network 100, how often an IQN can be sent by the wireless network 100 to the UE 110, and what order of magnitude of changes shall be reported in an IQN, whether the UE 110 is a consumer node of an IQN and what information shall be included in the IQN to be sent to the UE 110.

In step 1, a UE and/or AMF, SMF 140 may pass the following information on to the aggregator NF/AF at the time of subscribing to IQN:

Specific V2X application that UE 110 intends to initiate, e.g., high-density platooning, its flightpath 160 comprising at least of a starting point and a destination point 170, start time.

Required QoS profiles expressed in terms of QoS parameters, e.g., 5QI, and QoS characteristics, e.g., Packet Delay Budget (PDB), associated with each QoS flow pertaining to the V2X application it intends to originate.

Threshold associated with KPIs of QoS parameters and characteristics.

And, how much in-advance (in time) an IQN can be accepted PDU Session information.

On receiving such an IQN subscription, the aggregator NF/AF will retrieve (step 3) UE configuration information and subscriber category from AMF 130 and UDM/UDR respectively. The aggregator NF/AF will check (step 4) if received IQN subscription matches any of the existing PQCN with suitable combination of a) location and b) QoS requirements and optionally c) UE configuration information d) UE subscription capabilities.

If a match is found with an existing PQCN subscription, the aggregator NF/AF will perform (step 5) mapping of the IQN and PQCN. When PDU session or QoS Flow is modified with new QoS parameters, the mapping will be updated. Alternatively, or additionally, the mapping may also be updated when the UE 110 moves along the flightpath to a new location.

That is because the PQCN subscription corresponds to a specific geographic area.

In response, in step 6, an NWDAF will collect relevant data from OAM to determine whether any QoS change is expected. If so, a PQCN, e.g., Nwdaf_AnalyticsSubscription_Notify will be generated and sent by the aggregator NF/AF to the NEF/AF (step 7), and the NEF/AF will forward (step 8) it as a Nnef_AnalyticsExposure_Notify to the aggregator NF/AF.

On receiving PQCN, in step 9, the aggregator NF/AF will perform threshold-based filtering whereby a fine-granular IQN is propagated only if it exceeds specific threshold for the UE 110 given its capabilities, subscriber category and location, thus minimizing false propagation of IQN and likelihood for wrong Application adaptation. Suppose 2 UEs are interested in the same V2X application, but one enjoys a higher subscriber category than the other. This means at the time of congestion; the network will strive to fulfil the QoS requirements of UE 110 that has the higher subscriber category than (or at the expense of) the other through pre-emption of resources.

Figure 6:
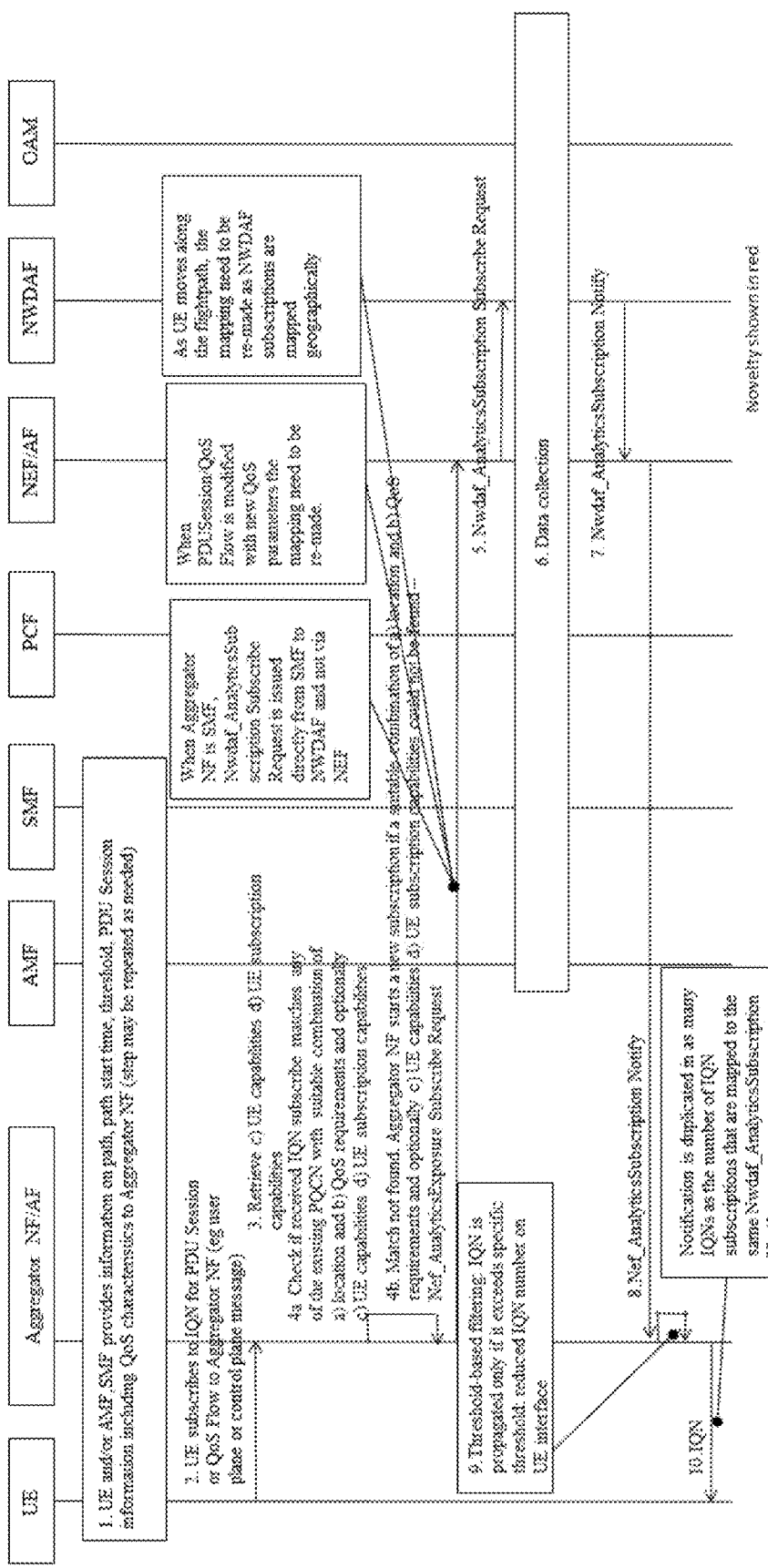
FIG. 6 is a combined flow chart and signalling scheme in a wireless communication network according to another example.

FIG. 6 depicts a combined flow chart and signalling scheme in a wireless communication network according to another embodiment. FIG. 6 depicts a case which is similar to the principles as explained in FIG. 5. The difference here is steps 4b and 5. FIG. 6 is related to a procedure at an IQN subscribe stage, which is normally supposed to follow the bootstrap stage. The PDU session is normally considered to be established at the bootstrap stage and relevant IQN consumer nodes have already subscribed to the specific PDU session. However, this embodiment concerns the scenario that there is not such an existing PDU session, and a request for the PQCN subscription is sent to the NWDAF in order to establish and subscribe a PDU session. Specifically, a Nwdaf_AnalyticsSubscription_Subscribe Request is sent (step 4b) to the NEF/AF, and the NEF/AF sends (step 5) a Nnef_AnalyticsExposure_Subscribe Request to the NWDAF.

Figure 7:
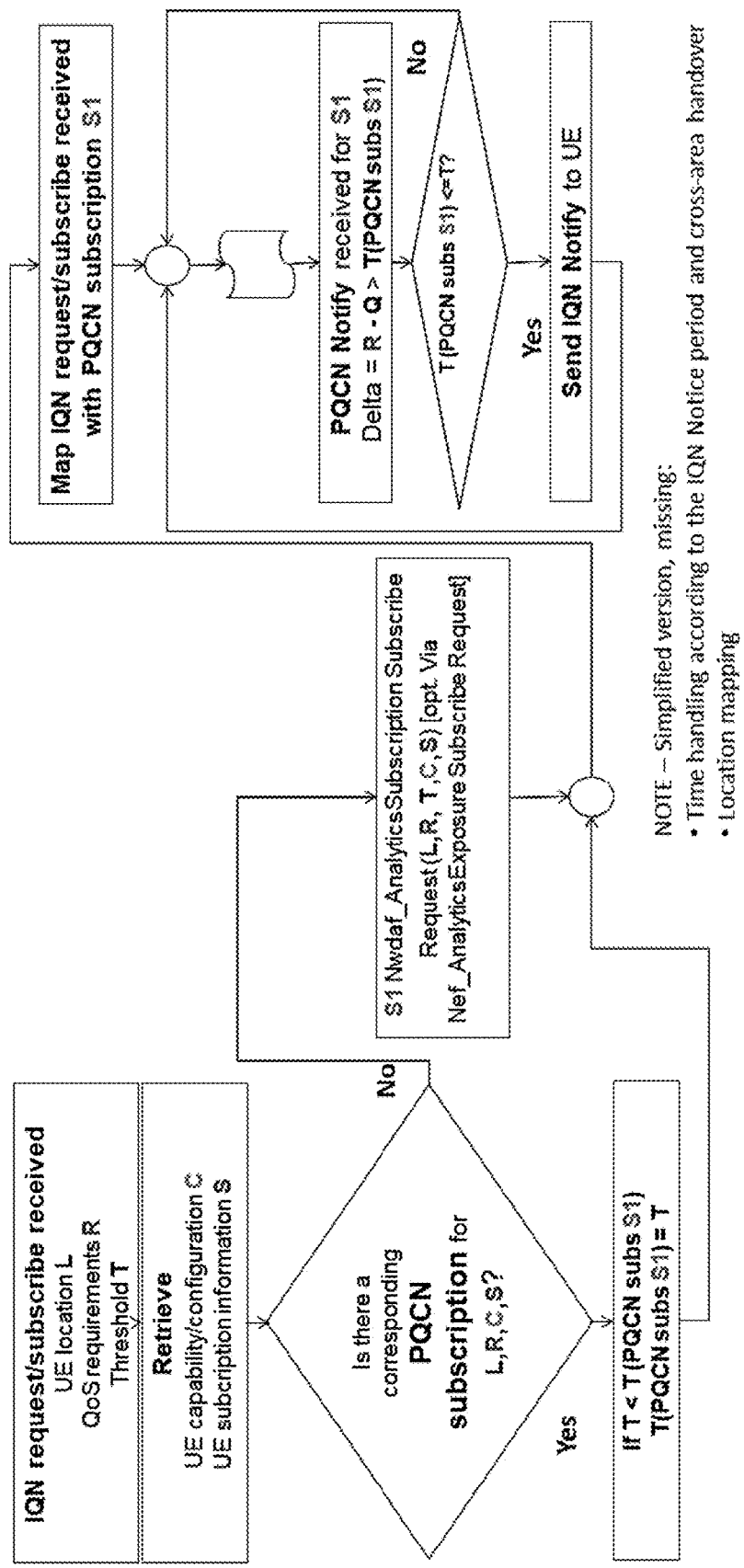
FIG. 7 is a flow chart illustrating a method in a first radio network node according to another example.

FIG. 7 depicts a flow chart illustrating a method in a first radio network node 190 according to another embodiment. Again, UE 110 is taken as an example of an IQN recipient. The first radio network node 190 receives a request for an IQN which comprises a location L, a required QoS R and a threshold T associated with the UE 110. The first radio network node 190 retrieves capability/configuration C and subscription information S associated with the UE 110. Then whether or not a corresponding PQCN subscription S1 (PSCN subs S1) matching the location L, required QoS R, capability/configuration C and subscription information S may be checked. If there is not such a corresponding PSCN subs S1, a Nwdaf_AnalyticsSubscription_Subscribe Request or additionally a Nnef_AnalyticsExposure_Subscribe Request may be sent to the NWDAF in order to establish it. Both of the above Requests may comprise the location L, required QoS R, capability/configuration C and subscription information S. In case there is already such a corresponding PSCN subs S1, if T<T(PSCN subs S1), T(PSCN subs S1)=T, wherein T represents Threshold. Next the IQN request may be mapped to the PSCN subs S1. Later on, a PQCN may be received with respect to the PSCN subs S1. Delta=R−Q>T(PSCN subs S1), wherein R=Required, Q=QoS Prediction. If T(PSCN subs S1)≤T may be determined. If true, an IQN may be sent to the UE 110 and the first radio network node 190 will wait for a further PQCN. If false, the first radio network node 190 will also wait for a further PQCN.

The IQN Notice Period may be defined as the time period indicating how long in-advance the IQN consumer node requires/desired to receive the IQN, before the QoS changes. This time period is use case-specific and is typically specified by the IQN consumer node at time of subscription. When there is a request from the IQN consumer node, the network 100 returns a QoS prediction which may be valid for a certain prediction time interval. The prediction time interval may start at the time the QoS prediction is generated and ends when the aforementioned prediction is no longer valid. How early an IQN will be generated depends on various factors, such as V2X application, vehicle speed, local weather conditions and congestion which however are not taken into consideration by the prior solution.

Figure 8:
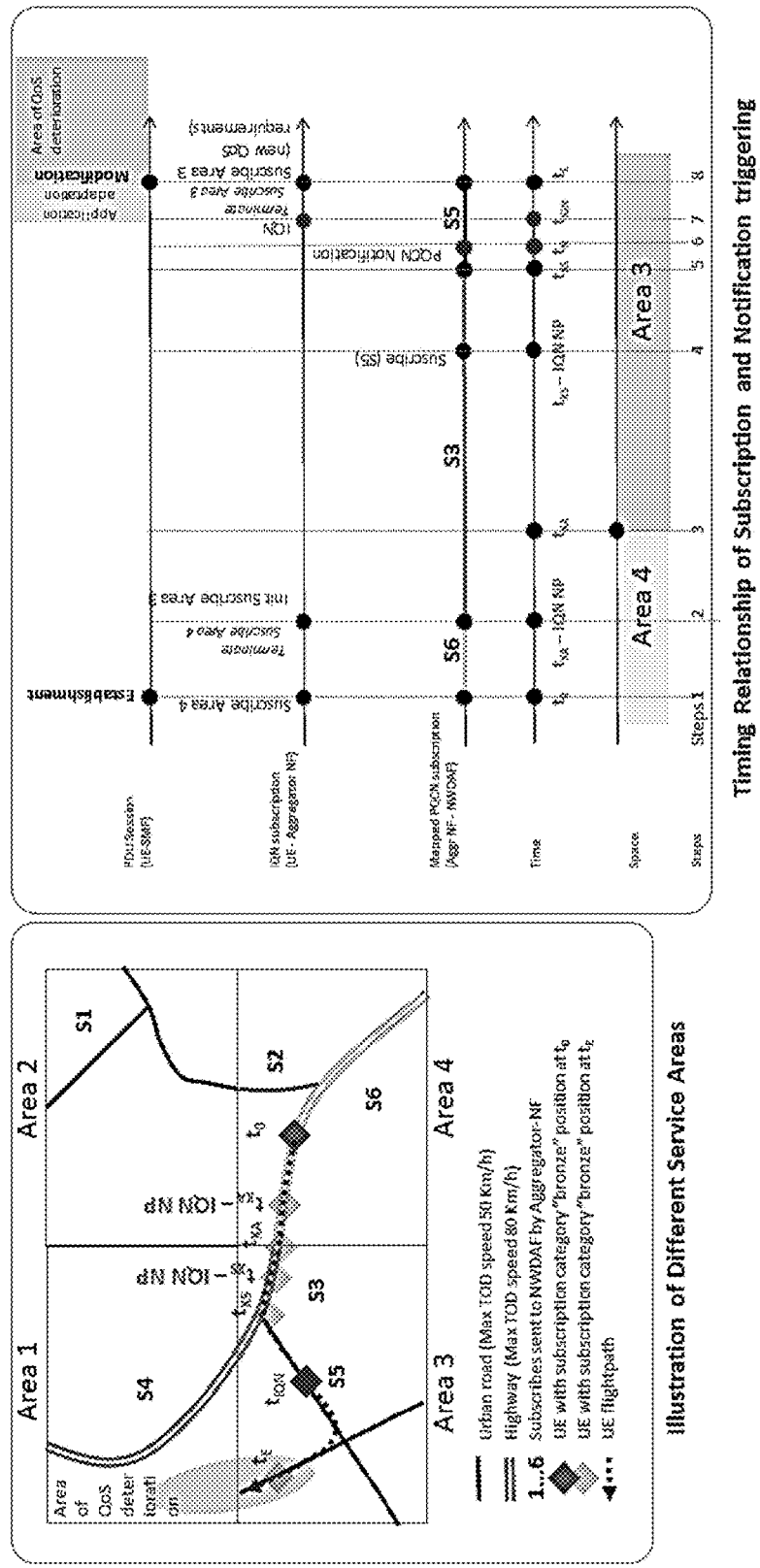
FIG. 8 is a diagram illustrating a method in a first radio network node according to another example.

FIG. 8 illustrates a method in a first radio network node according to another embodiment. This embodiment will be time will be explained by taking the timing factor into consideration. Again, the UE 110 and NWDAF will be used as an example of the IQN consumer node and the PQCN producer node 150, respectively. As a non-limiting example, PQCN subscriptions S1-S6 which corresponds to road segments RS1-RS6 (not shown) are illustrated. Meanwhile, there are four geographic areas, Areas 1-4, are involved.

At time t0 UE requests V2X Tele-operated Driving (ToD) service 1:

V2X ToD service 1 at 50 Km/h is mapped to QoS Requirement 1: UL throughput=230 Mbps, DL throughput=10 Mbps and latency=100 ms (available in highways) allocation and retention priority (ARP)=4.

Therefore it establishes a PDU Session with ToD AF according to QoS requirements 2, wherein QoS requirements 1 and QoS requirements 2 are different values for QoS such as, i.e., throughput, latency, etc.

At the same time the UE 110 requests to the PQCN consumer node 190 for IQN service associated with such PDU Session and provides a) flightpath information from t0 to tE; b) requested IQN Notice period and c) thresholds on QoS requirements, e.g., +/−10%.

It is possible that the PQCN consumer node 190 may be different in different areas. In such case IQN request is sent to the PQCN consumer node 190 at t0 (Area 4) and the PQCN consumer node 190 is responsible for delivering IQN. When UE 110 moves out from current area (e.g., Area 4) at tXAN IQN service is terminated by the PQCN consumer node 190 at least by tXA−IQN Notice Period and UE 110 may restart it with new IQN subscription in the new area, e.g., Area 3.

In case the PQCN consumer node 190 turns out to be an SMF 140, the IQN request may be embedded in PDU Session establishment at t0 and can as a PDU Session modification at tXA since the PDU Session is already established. Sometimes the IQN NP is confirmed by the PQCN consumer node 190 only after receiving response from NWDAF.

The PQCN consumer node 190 determines (based on flightpath information, QoS service request and other parameters) to which (existing) PQCN subscription IQN request from UE 110 is mapped (in the example S6, S3 and S5) and derives from PDU Session the QoS requirements 2 to be included in the PQCN subscription. It is assumed that PQCN subscriptions S6 and S3 already exist at t0 while subscription S5 does not exist for V2X ToD service 1 so it is later started by the PQCN consumer node 190 towards NWDAF. Threshold in PQCN may be the minimum of all the UE IQN subscriptions mapped to such PQCN subscription.

Before UE 110 leaves Area 4, at time by tXA−IQN Notice Period (NP) UE may start anew IQN subscription in new Area 3 and terminate the IQN subscription for Area 4. NWDAF maps new Area 3 IQN subscription on existing PQCN subscription S3.

At time tXA UE leaves Area 4 and enters Area 3.

At time tXS−IQN NP, since the UE 110 is moving towards road segment RS5 where related PQCN subscription for V2X ToD service 1 does not exist, the PQCN consumer node 190 subscribes S5 for road segment RS5 and ToD Service 1.

At time tXS UE 110 enters road segment RS5 (covered by subscribe S5).

At time tN NWDAF sends a Potential QoS Change Notification to the PQCN consumer node 190 for subscription S5 and road segment RS5.

At time tIQN the PQCN consumer node 190 has mapped received PQCN Notification to relevant UE 110. As threshold of PQCN is higher or equal than threshold of IQN, the PQCN consumer node 190 sends IQN to the UE 110.

At time tE UE 110 performs application adaptation reacting to the IQN received.

Figure 9:
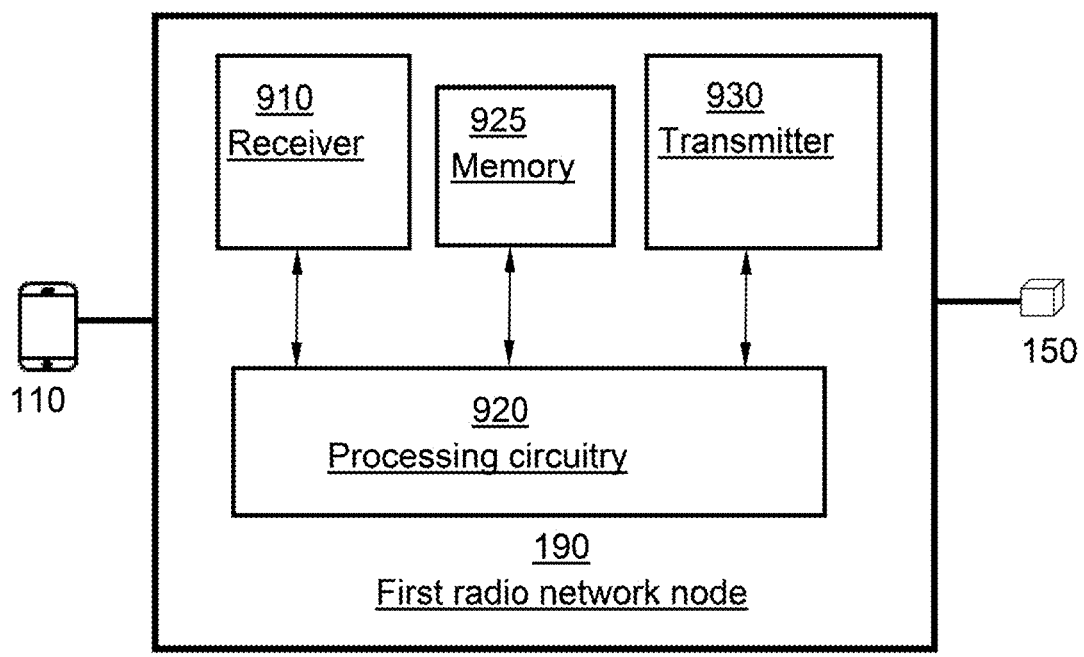
FIG. 9 is a block diagram illustrating a first radio network node according to an example.

FIG. 9 illustrates a block diagram illustrating a first radio network node 190 according to an embodiment for assisting application adjustment. The first radio network node 190 plays the roles of both PQCN consumer node and IQN producer node.

As discussed above, the first radio network node 190 may be the SMF 140 that is responsible for making subscriptions to the NWDAF per road segment, i.e., geographical locations, per service, i.e., 5G-specific QoS parameters such as 5QI, per UE subscription info, e.g., subscriber category or allowed-NSSAI, per UE configuration and capability, e.g., per RF capability or per configured-NSSAI.

The first radio network node 190 meanwhile also plays the role of an IQN distributor or producer node for sending an IQN to the IQN recipient. SMF 140 can be appropriate for such a role. This is because SMF 140 is already the 5GC node in charge of session management, e.g., Session Establishment, modify and release, including tunnel maintain between user plane function (UPF) and access node (AN), performs session management of AN through the AMF 130 and of control of the User Plane function for what concerns PDU Session resource handling and QoS management/control. This means that SMF 140 has total control of a PDU session and resource handling within a PDU Session (including resources in AN, resources in UPF and resources in tunnel between UPF and AN). This means that when the SMF 140 receives the PQCN from the originating NWDAF, it can be in a position to generate UE-specific fine-granular IQN and timely notify a UE 110 by collecting extra pieces of information especially regarding UE capabilities from AMF 130, subscription details from unified data repository (UDR)/unified data management (UDM).

Alternatively, the first radio network node 190 may be the AF. In this case subscription about Potential QoS Change Notification is received by NWDAF, however modifications to this subscription request is introduced according to the embodiments herein (more details will be discussed later).

The first radio network node 190 is configured to perform at least some of the method actions 301-309 for assisting application adjustment.

The first radio network node 190 may comprise a processing circuitry 920. The processing circuitry 220 is configured to perform at least some of the above described actions 301-309.

The first radio network node 190 may comprise a first receiver module 910, such as a receiver or transceiver. The first radio network node 190, the processing circuitry 920 and/or the first receiver module 910 may be configured to receive the request for the IQN which comprises at least one of: the location associated with the IQN recipient and the required QoS associated with the IQN recipient.

The first radio network node 190 may also comprise an obtaining module 902 (not shown). The first radio network node 190, the processing circuitry 920 and/or the obtaining module 902 may be configured to obtain the configuration information and/or subscription information associated with the IQN recipient.

The first radio network node 190 may also comprise a first determining module 903 (not shown). The first radio network node 190, the processing circuitry 920 and/or the first determining module 903 may be configured to determine whether or not there exists a PQCN subscription matching the location, QoS and at least one of: the configuration information or the subscription information associated with the IQN recipient and make the PQCN subscription if no matching PQCN subscription exists.

The first radio network node 190 may also comprise a requesting module 904 (not shown). The first radio network node 190, the processing circuitry 920 and/or the requesting module 904 may be configured to send to the second radio network node 150 a request for the PQCN subscription, wherein the request for the PQCN subscription comprises the first threshold and at least one of: configuration information or subscription information associated with the IQN recipient.

The first radio network node 190 may also comprise a mapping module 905 (not shown). The first radio network node 190, the processing circuitry 920 and/or the mapping module 905 may be configured to map a request for an in-advance quality of service prediction notification, IQN, from an IQN recipient to an existing PQCN subscription, based on the location, the required quality of service, QoS and at least one of: the configuration information associated with the IQN recipient or subscription information associated with the IQN recipient.

The first radio network node 190, the processing circuitry 920 and/or the mapping module 905 may further be configured to update, when the QoS related to the IQN recipient updates, the mapping between the IQN request from the IQN recipient and the corresponding PQCN subscription.

The first radio network node 190 comprises a second receiver 906 (not shown), e.g., a receiver or transceiver. The first radio network node 190, the processing circuitry 920, the first receiver 910 and/or the second receiver 906 is configured to receive a PQCN from a second radio network node 150.

The first radio network node 190 comprises an associating module 907 (not shown). The first radio network node 190, the processing circuitry 920, the first receiver 910 and/or the associating module 907 is configured to associate the PQCN with the IQN recipient based on the mapping. Optionally, the PQCN comprises at least one of: an indication indicating whether a predicted QoS value will be higher or lower than a first threshold or difference between the predicted QoS value for the IQN recipient and the first threshold.

The first radio network node 190 may also comprise a second determining module 908 (not shown). The first radio network node 190, the processing circuitry 920 and/or the second determining module 908 may be configured to determine whether or not the predicted value of QoS meets the threshold when the PQCN comprises the predicted value of QoS for the IQN recipient.

The first radio network node 190 comprises a transmitter 930. The first radio network node 190, the processing circuitry 920 and/or the transmitter 930 is configured to send an IQN to the IQN recipient according to the received PQCN. Alternatively, the IQN to the IQN recipient may only be sent when the predicted value of QoS does not meet the second threshold.

The processing circuitry 920 may comprise one or more instances of a processing circuit, i.e., a Central Processing Unit (CPU), a processing unit, a processor, an Application Specific Integrated Circuit (ASIC), a microprocessor, or other processing logic that may interpret and execute instructions. The herein utilized expression "processing circuitry" may thus represent a processing circuitry comprising a plurality of processing circuits, such as, e.g., any, some or all of the ones enumerated above.

Furthermore, the first radio network node 190 may comprise a memory 925 in some embodiments for storing related information and/or data in order to perform the described corresponding method. The optional memory 925 may comprise a physical device utilized to store data or programs, i.e., sequences of instructions, on a temporary or permanent basis.

According to some embodiments, the memory 925 may comprise integrated circuits comprising silicon-based transistors. The memory 925 may comprise, e.g., a memory card, a flash memory, a universal serial bus (USB) memory, a hard disc, or another similar volatile or non-volatile storage unit for storing data such as, e.g., ROM (Read-Only Memory), PROM (Programmable Read-Only Memory), EPROM (Erasable PROM), EEPROM (Electrically Erasable PROM), etc. in different embodiments.

The method actions 301-309 may be implemented through the one or more processing circuitries 920 together with computer program product for performing the functions, for (enabling) assembling and sending of IQN to the recipient, when the respective computer program runs on a computer.

Figure 10:
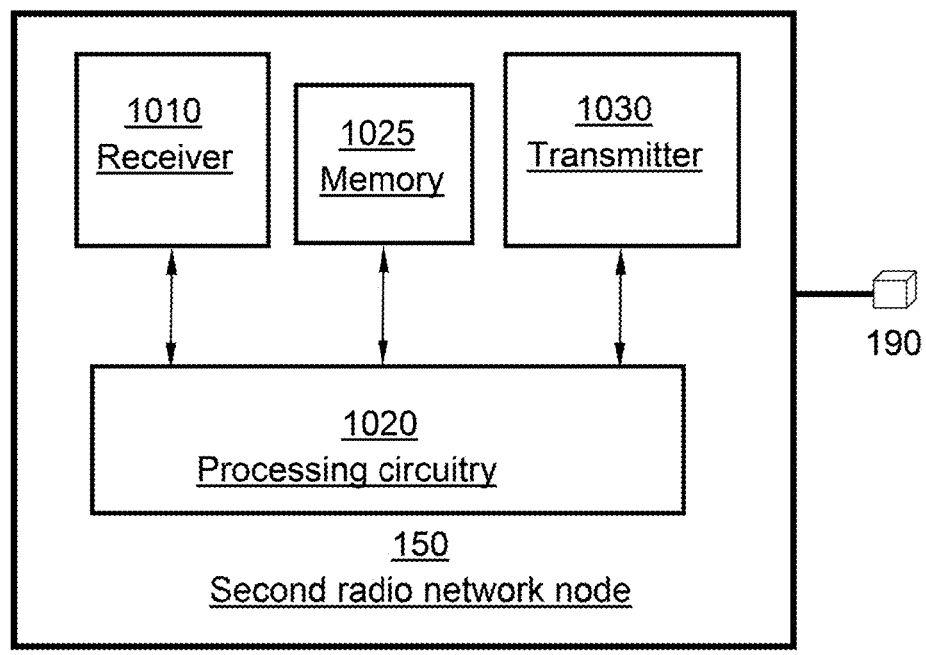
FIG. 10 is a block diagram illustrating a second radio network node according to an example.

FIG. 10 illustrates a block diagram illustrating a second radio network node 150, e.g., a PQCN producer node according to an embodiment for assisting application adjustment. The second radio network node 150 plays the role of PQCN producer node. The second radio network node 150 is configured to perform at least some of the method actions 401-403 for assembling and sending an IQN to an IQN consumer node/recipient.

The second radio network node 150 may comprise a processing circuitry 1020. The processing circuitry 220 is configured to perform at least some of the above described actions 401-403.

The second radio network node 150 comprises a transmitter 1030, such as a transmitter or transceiver. The second radio network node 150, the processing circuitry 1020 and/or the transmitter 1030 is configured to send a PQCN associated with the IQN recipient to a first radio network node 190. The PQCN notifies that a predicted QoS value related to the IQN recipient changes from a first threshold, wherein the predicted QoS value is determined based on at least one of: the configuration information or subscription information associated with the IQN recipient.

The PQCN comprises at least one of: an indication indicating whether a predicted QoS value will be higher or lower than a first threshold or difference between the predicted QoS value for the IQN recipient and the first threshold according to some embodiments.

The second radio network node 150 may comprise an establishing module 1001 (not shown). The second radio network node 150, the processing circuitry 1020 and/or the establishing module 1001 may be configured to establish the PQCN subscription matching a location, a required QoS and at least one of: the configuration information or subscription information associated with the IQN recipient.

The second radio network node 150 may comprise a receiver module 1010, such as a receiver or transceiver. The second radio network node 150, the processing circuitry 1020 and/or the receiver module 1010 may be configured to receive from the first radio network node 190 a request for a PQCN subscription, wherein the request for the PQCN subscription comprises the first threshold and at least one of: configuration information or subscription information associated with the IQN recipient.

The processing circuitry 1020 may comprise one or more instances of a processing circuit, i.e., a Central Processing Unit (CPU), a processing unit, a processor, an Application Specific Integrated Circuit (ASIC), a microprocessor, or other processing logic that may interpret and execute instructions. The herein utilized expression "processing circuitry" may thus represent a processing circuitry comprising a plurality of processing circuits, such as, e.g., any, some or all of the ones enumerated above.

Furthermore, the second radio network node 150 may comprise a memory 1025 in some embodiments for storing related information and/or data in order to perform the described method in the second radio network node. The optional memory 1025 may comprise a physical device utilized to store data or programs, i.e., sequences of instructions, on a temporary or permanent basis. According to some embodiments, the memory 1025 may comprise integrated circuits comprising silicon-based transistors. The memory 1025 may comprise, e.g., a memory card, a flash memory, a USB memory, a hard disc, or another similar volatile or non-volatile storage unit for storing data such as, e.g., ROM (Read-Only Memory), PROM (Programmable Read-Only Memory), EPROM (Erasable PROM), EEPROM (Electrically Erasable PROM), etc. in different embodiments.

The method actions 401-403 may be implemented through the one or more processing circuitries 1020 together with computer program product for performing the functions, for (enabling) assembling and sending of IQN to the recipient, when the respective computer program runs on a computer.

The computer program products mentioned above may be provided for instance in the form of a data carrier carrying computer program codes for performing the respective methods. The data carrier may be, e.g., a hard disk, a compact disk (CD) ROM disc, a memory stick, an optical storage device, a magnetic storage device or any other appropriate medium such as a disk or tape that may hold machine readable data in a non-transitory manner. The computer program product may furthermore be provided as computer program codes on a server and downloaded to the first radio network node 190 or second radio network node 150, e.g., over an Internet or an intranet connection.

According to another embodiment, a system comprising at least one of the first radio network node 190 or the second radio network node 150 is also provided.

The terminology used in the description of embodiments as illustrated in the accompanying drawings is not intended to be limiting of the described methods and apparatuses. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as, e.g., a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

What is claimed is:

1. A first radio network node for assisting application adjustment, the first radio network node comprising processing circuitry configured to:
   receive a request for an in-advance quality of service prediction notification (IQN) from an IQN recipient, wherein the request comprises at least one of: a location associated with the IQN recipient and a required quality of service (QoS) associated with the IQN recipient;
   determine whether or not there exists a corresponding potential quality of service change notification (PQCN) subscription matching the location, the required QoS and at least one of: configuration information or subscription information associated with the IQN recipient;
   upon determining that the corresponding PQCN subscription does not exist, make the corresponding PQCN subscription;
   send to a second radio network node a request for the corresponding PQCN subscription, wherein the request for the corresponding PQCN subscription comprises a first threshold and at least one of: the configuration information or the subscription information associated with the IQN recipient;
   map the request for the IQN to the corresponding PQCN subscription, based on the location, the required QoS and at least one of: the configuration information or the subscription information associated with the IQN recipient;
   receive the corresponding PQCN from the second radio network node;
   associate the corresponding PQCN with the IQN recipient;
   wherein the association is based on the mapping between the request for the IQN from the IQN recipient and the corresponding PQCN subscription; and
   send an IQN to the IQN recipient for assisting the application adjustment.

2. The first radio network node according to claim 1, wherein
   the configuration information associated with the IQN recipient comprises at least one of: radio frequency capability, configured network slice selection assistance information (NSSAI), radio access technology type; and/or
   the subscription information associated with the IQN recipient comprises at least one of: a time window, a subscriber category and an allowed NSSAI.

3. The first radio network node according to claim 1, wherein the PQCN comprises at least one of: an indication indicating whether a predicted QoS value will be higher or lower than the first threshold, or a difference between the predicted QoS value for the IQN recipient and the first threshold,
   wherein the processing circuitry of the first radio network node is further configured to:
   send the IQN to the IQN recipient based on the predicted of QoS value not meeting a second threshold.

4. The first radio network node according to claim 1, the processing circuitry further configured to:
   update, when the QoS related to the IQN recipient updates, the mapping between the IQN request from the IQN recipient and the corresponding PQCN subscription.

5. A method for a first radio network node, the method comprising:
   receiving a request for an in-advance quality of service prediction notification (IQN) from an IQN recipient, wherein the request comprises at least one of: a location associated with the IQN recipient and a required quality of service (QoS) associated with the IQN recipient;
   determining whether or not there exists a corresponding potential quality of service change notification (PQCN) subscription matching the location, the required QoS and at least one of: configuration information or subscription information associated with the IQN recipient;
   upon determining that the corresponding PQCN subscription does not exist, making the corresponding PQCN subscription;
   sending to a second radio network node a request for the corresponding PQCN subscription, wherein the request for the corresponding PQCN subscription comprises a first threshold and at least one of: the configuration information or the subscription information associated with the IQN recipient;
   mapping the request for the IQN to the corresponding PQCN subscription, based on the location, the required QoS and at least one of: the configuration information or the subscription information associated with the IQN recipient;
   receiving the corresponding PQCN from the second radio network node;
   associating, the corresponding PQCN with the IQN recipient;
   wherein the association is based on the mapping between the request for the IQN from the IQN recipient and the corresponding PQCN subscription; and
   sending an IQN to the IQN recipient for assisting the application adjustment.

6. A system comprising the first radio network node according to claim 1, and a second radio network node wherein the second radio network node comprises processing circuitry configured to:
   send the PQCN to the first radio network node for assisting the application adjustment, and
   wherein the PQCN notifies that a predicted quality of service (QoS) value related to the IQN recipient changes from the first threshold, wherein the predicted QoS value is determined based on at least one of: the configuration information or the subscription information associated with the IQN recipient.

7. The system according to claim 6, wherein the PQCN comprises at least one of: an indication indicating whether the predicted QoS value will be higher or lower than the first threshold; or a difference between the predicted QoS value and the first threshold.

8. The system according to claim 7, wherein the processing circuitry of the second radio network node is further configured to:
receive from the first radio network node a request for a PQCN subscription, wherein the request for the PQCN subscription comprises the first threshold and at least one of: the configuration information or the subscription information associated with the IQN recipient.

9. A non-transitory computer-readable medium having instructions stored thereon, the instructions, when executed on at least one processor, cause the first radio network node to perform the method according to claim 5.

* * * * *

UNITED STATES PATENT AND TRADEMARK OFFICE
CERTIFICATE OF CORRECTION

| | | |
|---|---|---|
| PATENT NO. | : 12,108,287 B2 | Page 1 of 1 |
| APPLICATION NO. | : 17/554893 | |
| DATED | : October 1, 2024 | |
| INVENTOR(S) | : Consoli et al. | |

It is certified that error appears in the above-identified patent and that said Letters Patent is hereby corrected as shown below:

In the Claims

Claim 6: Column 22, Line 60: "according to claim 1, and a second radio network node" should read as -- according to claim 1, and a second radio network node, --.

Signed and Sealed this
Twentieth Day of May, 2025

Coke Morgan Stewart
*Acting Director of the United States Patent and Trademark Office*